United States Patent [19]

Hellwig et al.

[11] Patent Number: 5,277,005
[45] Date of Patent: Jan. 11, 1994

[54] FREE-STANDING PARTITIONING PANEL

[75] Inventors: John Hellwig, Toronto; Lorie Marangoni, Weston, both of Canada

[73] Assignee: Teknion Furniture Systems, Downsview, Canada

[21] Appl. No.: 878,431

[22] Filed: May 4, 1992

[51] Int. Cl.⁵ .............................................. E04F 19/06
[52] U.S. Cl. ................... 52/220.1; 52/220.7; 174/48
[58] Field of Search ............ 52/28, 221, 220.1, 220.7; 174/48, 49

[56] References Cited

U.S. PATENT DOCUMENTS

| | | | |
|---|---|---|---|
| 2,321,568 | 6/1943 | Wilson | 174/49 |
| 2,766,855 | 10/1956 | Johnson et al. | 52/127.12 |
| 3,195,698 | 7/1965 | Codrea | 52/221 |
| 3,471,629 | 10/1969 | O'Leary | 52/221 |
| 4,391,073 | 7/1983 | Mollenkopf et al. | 52/221 |
| 4,535,577 | 8/1985 | Tenser et al. | 52/221 |
| 4,631,881 | 12/1986 | Charman | 174/48 |
| 4,876,835 | 10/1989 | Kelley et al. | 52/28 |
| 5,038,539 | 8/1991 | Kelley et al. | 52/28 |
| 5,062,246 | 11/1991 | Sykes | 52/242 |

Primary Examiner—James L. Ridgill, Jr.

[57] ABSTRACT

The present invention relates to office panelling systems and in particular to office panelling systems having improved construction. The frame of the panels provides an improved electrical power feed arrangement within the panel as well as more convenient access to power outlets within the panel. The frame is also designed for enhanced cooperation with filing cabinets and filing bins to provide lower support for such cabinets and bins when hung from the office panel, particularly when the bin or cabinet is intermediary vertical supports of the frame.

17 Claims, 6 Drawing Sheets

a
FREE-STANDING PARTITIONING PANEL

FIELD OF THE INVENTION

The present invention relates to office panelling systems and, in particular, to office panelling systems which utilize free-standing frames which are interconnected to collectively support the system.

BACKGROUND OF THE INVENTION

Free-standing office panelling systems are known and one particular system which has proven popular is shown in our U.S. Pat. No. 4,535,577. These free-standing systems have improved structural rigidity when they are mechanically interconnected, and one such arrangement for mechanically interconnecting such systems is shown in our U.S. Pat. No. 4,881,349 incorporated herein by reference.

The office panelling system not only subdivides free office space into various working areas or units, it also provides for power at these work units and accommodates the feeding of communication cables and the like through the system. It has been found that power at desk height is the most convenient and this capability was provided in our earlier patent. There remains a need to simplify the provision of power at desk height and to allow for the convenient locating positioning of power outlets at the desk height.

There is also a need to simplify the manufacture of decorative elements secured to the panels and improving the definition and edge detail thereof.

SUMMARY OF THE INVENTION

In an office panelling system, according to the present invention, a number of separate panels are mechanically interconnected and each panel includes an interior framework which supports decorative elements either side thereof. The panels cooperate to define a horizontal electrical conduit extending in the length of and interior to the panels. The electrical conduit in each panel has side plates and a removable top plate. The top plate has a number of knockout areas for receiving electrical outlets which, when received, are accessible from above the top plate. The electrical conduit in each panel further includes a bottom member which cooperates with the sides and the top plate to close the conduit in the length thereof. The side plates are preferably removable to provide increased access when the decorative covers are removed.

According to an aspect of the invention, an open storage area is above the top plate and this open storage area is closed at the sides by a movable elongate cover which can be moved to provide access to the storage area.

According to yet a further aspect of the invention, the movable elongate cover is hinged at an upper edge thereof and connected to the frame.

According to yet a further aspect of the invention, the movable elongate cover is foldable upon itself in the longitudinal direction thereof to reduce the amount of free space required to open the storage area by movement of the elongate cover.

The hinging and folding of the elongate cover are preferred to removal, however, this is also an option.

According to yet a further aspect of the invention, electrical outlets are provided in the storage area and the upper surface thereof are positioned at a level generally corresponding with the bottom edge of the movable elongate cover.

According to yet a further aspect of the invention, the electrical outlets are mounted in a box enclosure secured to the top plate of the electrical raceway.

According to a further aspect of the invention, the movable cover is a metal plate and the decorative panel below the movable cover is of acoustical material.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
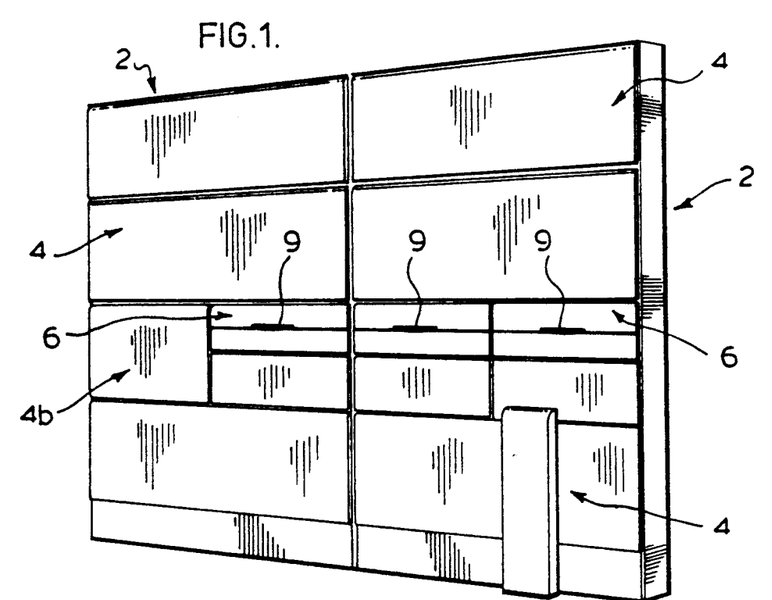
FIG. 1 is a perspective view of two interconnected office panels.

The office panelling system is made of individual office panels 2 having decorative elements or covers 4. These decorative elements can take various forms, for example, transparent panels, upholstered covers, pass through frames, and other arrangements for finishing the individual panel in a manner suitable for the application. Hinged access doors 6 are shown and the lower edge of the doors is at approximately desk height (30 inches).

Figure 2:
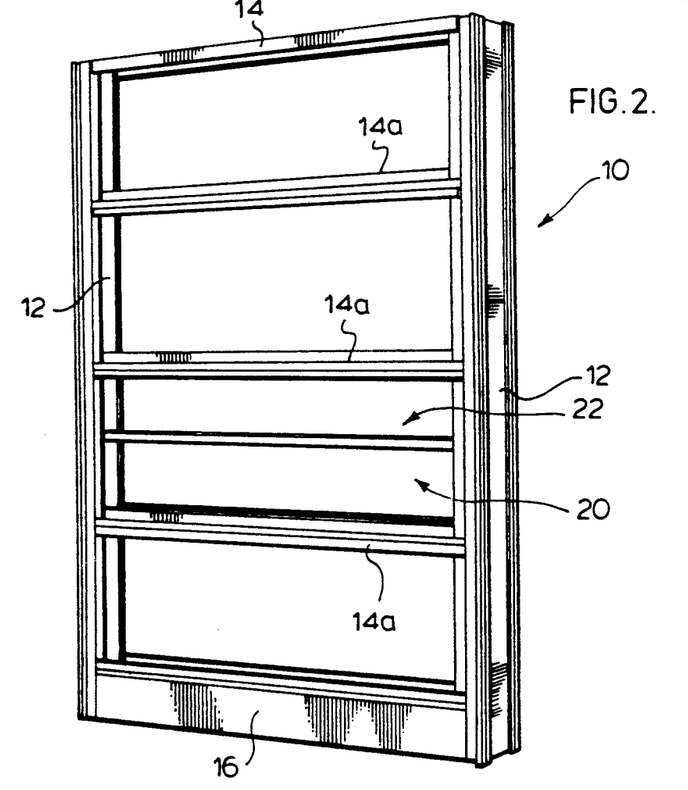
FIG. 2 is a perspective view of a frame of an office panel.

The interior frame for each of the office panels 2 is shown as 10 in FIG. 2. The panels can be of various heights with the height of a base panel preferably being approximately 36 inches. The base panel can be higher if the stacking feature is not used, however, the access opening, when provided, is preferably maintained at the same level. Vertical members 12 form the ends of the office panels and horizontal members 14 serve to interconnect the vertical members. A base member 16 is provided at the bottom edge of the panel. An electrical conduit space is defined and is generally shown as 20. Directly above this electrical conduit space is a power access and storage space shown as 22. The electrical conduit will allow electrical wires to pass through the office panel and power access ports are provided to connect the conduit to the power access and storage space 22.

Figure 3:
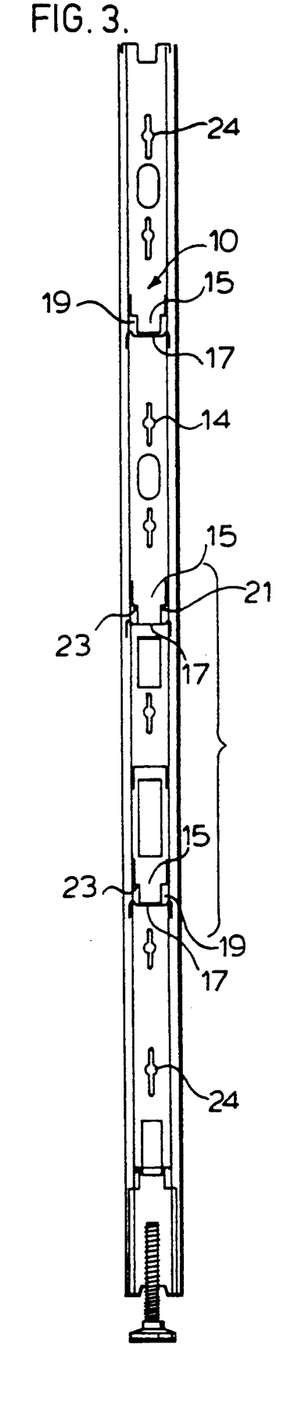
FIG. 3 is an end view showing various panels stacked, one atop the other.

An end view of the frame of FIG. 2 is shown in FIG. 3. In this case, each horizontal member 14 is basically two members, an upper member 15 which has a small base centered on the larger U-shaped member 17. This provides a small slot recess 19 running the length of the horizontal members 14. This recess allows securement of office accessories, such as filing cabinets and desks, at any point where the recess 18 is accessible. Note that in FIG. 1, decorative cover 4b covers one such recess. Upper member 15 also includes horizontally extending flanges 21 and 23 which serve to close the upper surface of slot recess 19. These horizontal members 14 provide this slot recess in the panel at discrete locations and the slot is open on the front and preferably closed on the other sides.

Figure 4:
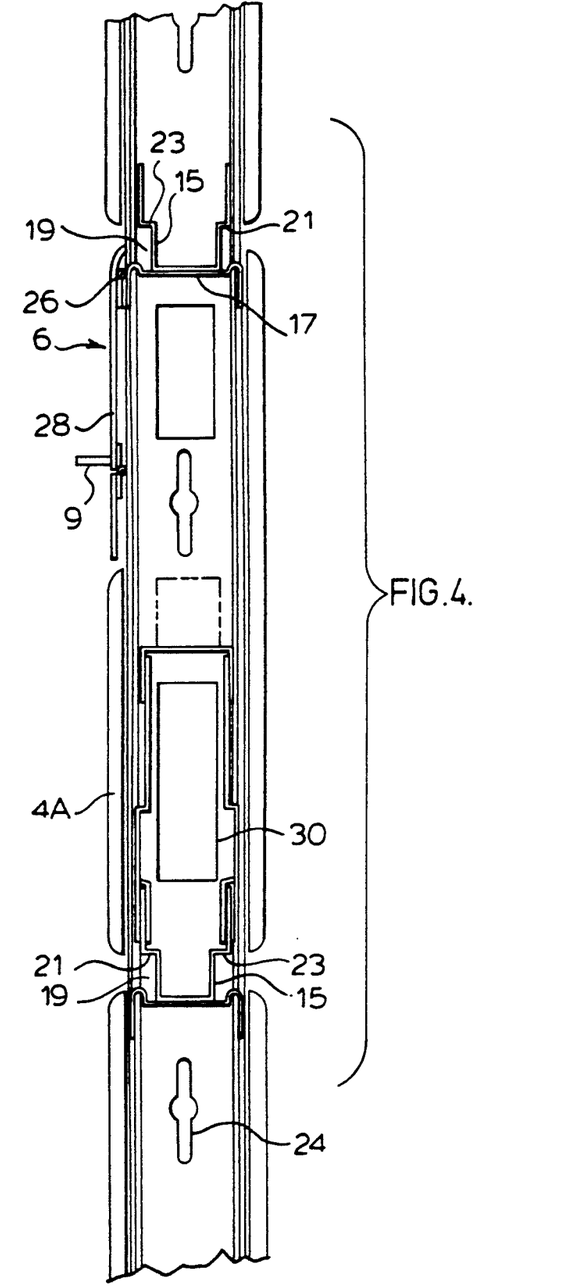
FIG. 4 is a partial end view showing details of the panels adjacent the electrical conduit.
Figure 5:
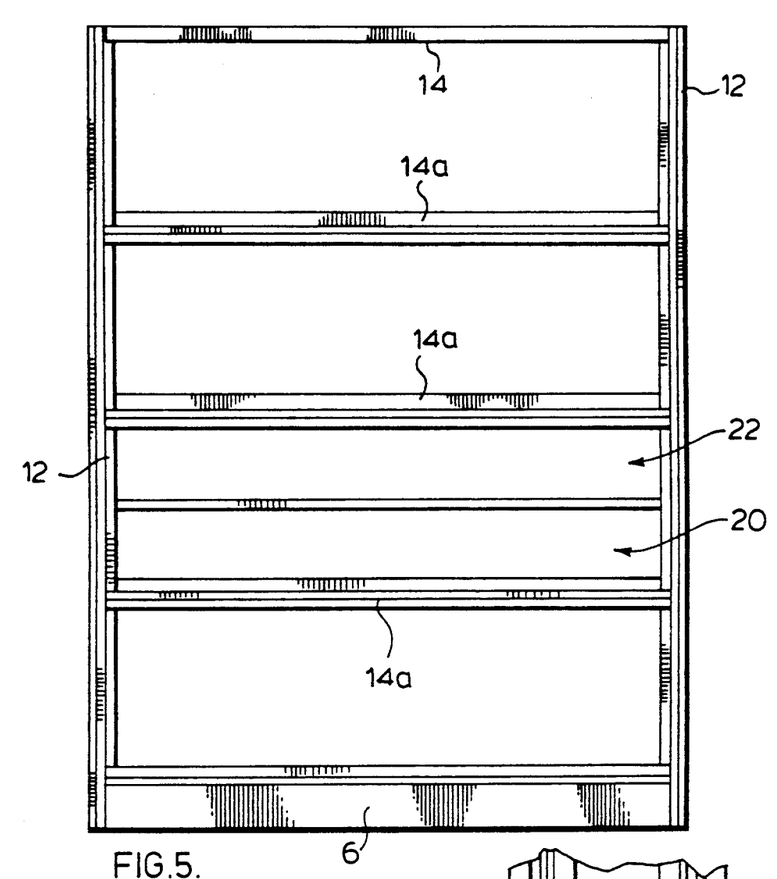
FIG. 5 is a front view of the base frame of a panelling system.
Figures 8, 9:
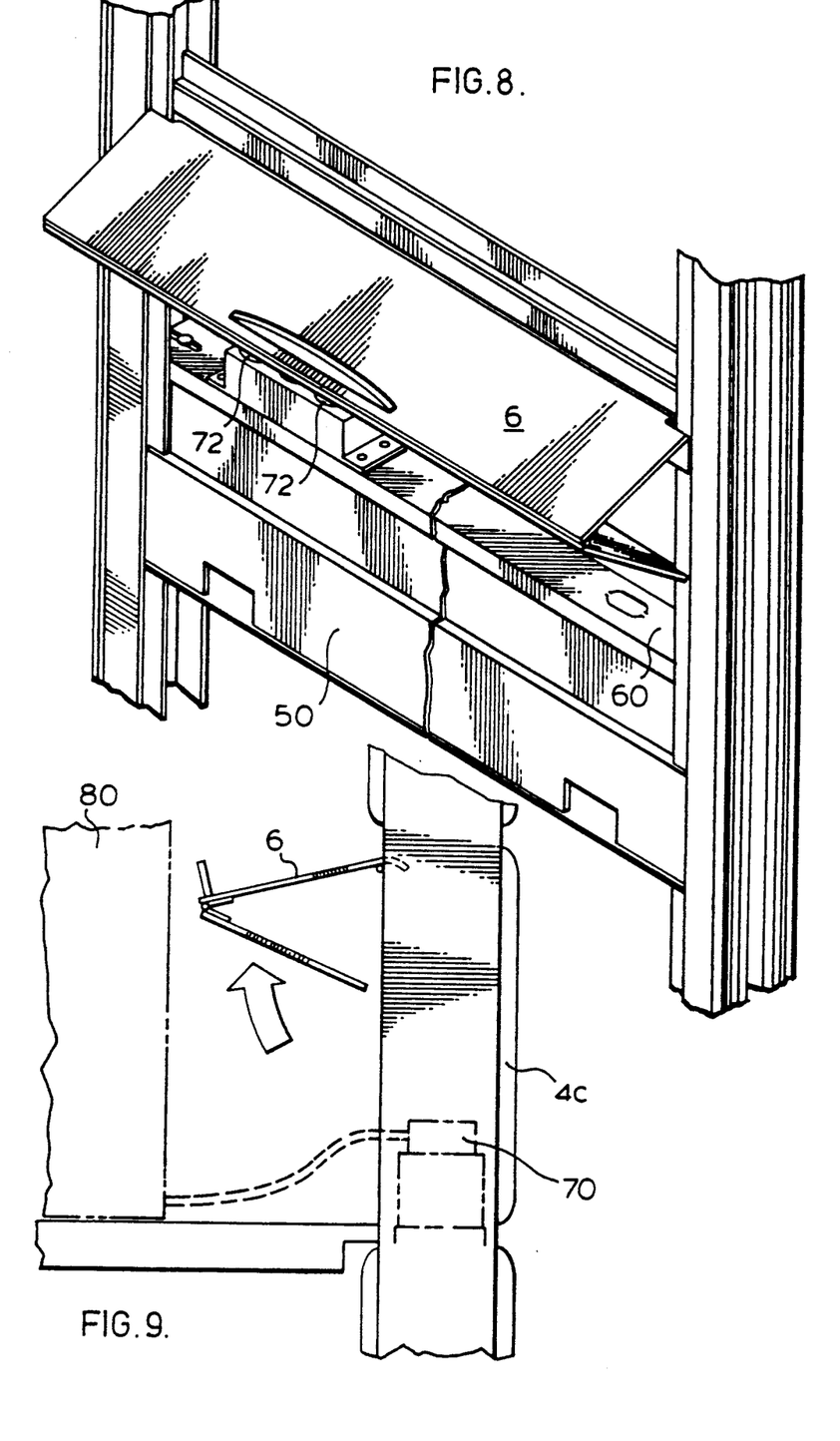
FIG. 8 is a partial perspective view showing details with the electrical conduit in an assembled condition.
FIG. 9 is a partial side view showing operation of one of the movable covers.
Figure 10:
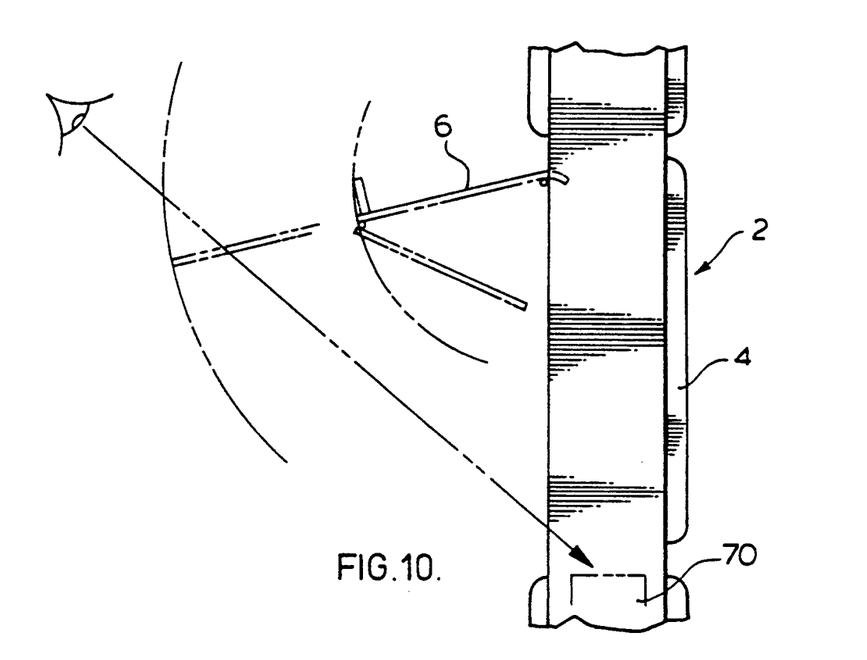
FIGS. 10 and 11 are side views showing details of movement of the movable cover to access the open storage area.
Figure 11:
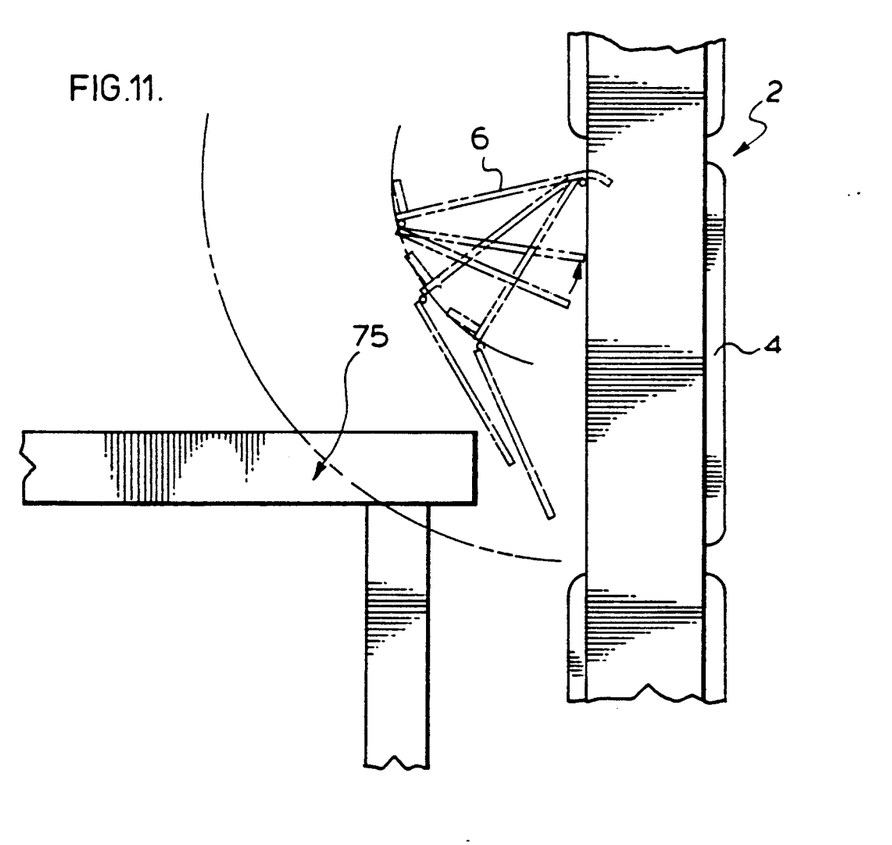

Various ports 24 have been provided in the vertical members 12 to allow securement or mechanical interconnection between adjacent panels. A key type member passes through the slot, is rotated 90°, and is then brought into engagement with a like slot of an adjacent panel to effect a clamping type action. Details of this type of arrangement are shown in U.S. Pat. No. 4,881,349. Details of the hinged door 6 are shown in FIG. 4 where it can be seen that the door has a top hinge 26 connecting it to the interior frame 10, with the door also being hinged in its height at 28 to allow folding or hinging along the longitudinal axis of the hinged door 6. Details of the movement of the door and the hinging of the door are shown in FIGS. 9 through 11. Handle 9 facilitates the user in moving and folding of the door. Immediately below the access door 6 is an elongate panel element 4A which covers on the one side of the panel the area used for accommodating the electrical conduit 20. To facilitate the feeding of wires into this conduit space, a port 30 has been provided in the vertical members 12 of the interior frame 10. Panel element 4A can be held in place adjacent the upper edge by engaging the vertical members 12. The space above top plate 60 (FIG. 8) and behind panel 4A is used to receive box receptacle 70.

Figure 6:
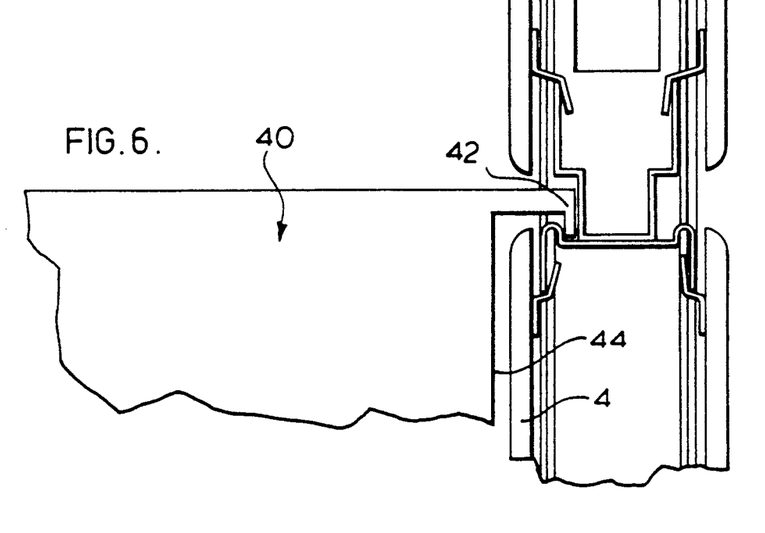
FIG. 6 shows details of securement of an office accessory to the office panels.

The fastening of office accessories, such as filing cabinets, can be appreciated from FIG. 6. In this case, a filing cabinet 40 has a hook attachment 42 received within the recess 19 defined by one of the horizontal members 14 and 14a. The filing cabinet 40 has a depth dimension corresponding to, or greater than, the spacing between various horizontal members of the same panel. In this way, the back edge 44 will press against one of the decorate elements 4 and indirectly against one of the horizontal members 14. This arrangement provides very stable securement of the filing cabinet or other office accessory with proper support at a lower horizontal position due to the interior rails of the office panel. Thus, if the cabinet is hung on a single panel, then a horizontal member will pick up the support intermediate the length of the office accessory. If the office accessory is hung between two panels, the horizontal members will also provide support, however, the vertical end members will also provide support. Thus, the placement of the horizontal members has been determined and coordinated with the depth of office panel accessories to provide proper support while allowing the simple hook type engagement biased by the gravity of the accessory to ensure that the office accessory can be moved, if desired, at a later point in time without exposing a damaged panel. Some office accessories may be supported by the vertical members of a panel, but the intermediate horizontal members facilitate placement of filing cabinets, overhead bins and the like components between or without direct support from the vertical members.

Figure 7:
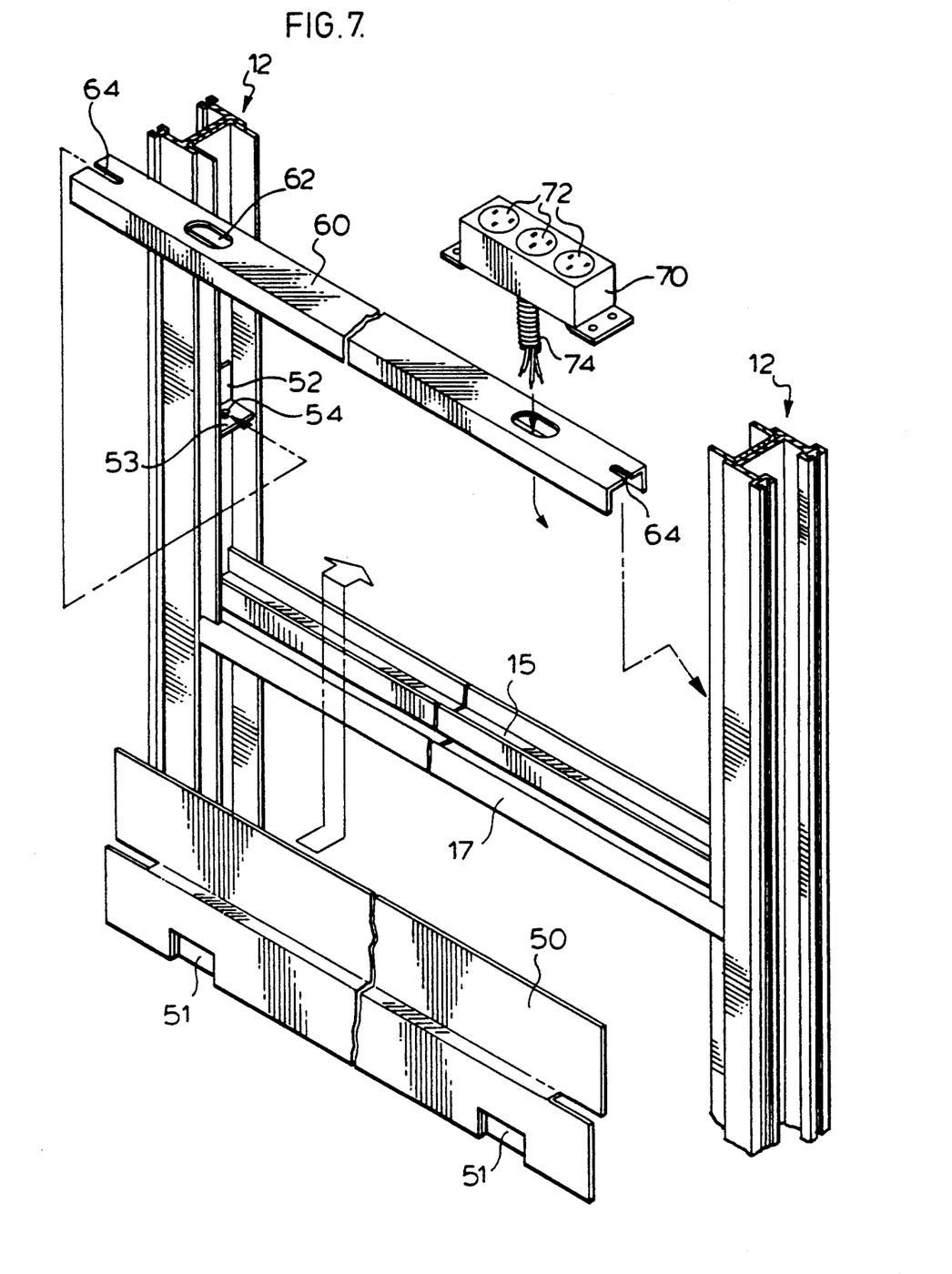
FIG. 7 is a partial exploded perspective view showing details of the electrical conduit.

Details of the components defining the electrical conduit space 20 are shown in FIG. 7. The lower horizontal rail of the conduit is defined by members 17 and 15 which extend between the vertical members 12. Side plate members 50 are secured either side of the panel by tabs 51 being received to the interior of the member 15 with the adjacent lower edges of the plate member received to the exterior of this member. This allows the side plates 50 to be dropped into engagement with the vertical members and the horizontal members 15. A bracket 52 is secured to each of the vertical members 12 and includes an adjustable fastener 54 projecting above an extending surface 53. The top plate 60 includes a number of knockouts 62 which allow passage of a power cable 74 therethrough should an electrical box receptacle 70 be desired at that point on the top plate. This box receptacle is mechanically fastened to the upper surface of the top rail. In order to secure the top rail within the panel, it is disposed at an angle relative to the bracket 52 to allow the slot 64 in one end of the top plate to be inserted under a flange portion of the fastener 54. A similar arrangement is accomplished at the other end where, in this case, the fastener is normally removed and then reinserted once the top plate has been secured in position. Thus, it can be seen that the top plate 60 is removable from the assembled office panel merely by releasing one of the fasteners 54 and removing of the top plate. This adaptability is beneficial when changes are to be made to the number of electrical outlets provided on the top plate as may become necessary due to changing needs, for example, during rearranging of the interior space subdivided by the panel. The side plates 50 are removable and this simplifies feeding of additional cables and/or making any additional changes to the electrical conduit. Thus, although this space can be an electrical conduit or electrical passageway, the components are easily removable to allow changes to be made thereto. The side plates 50, only one of which is shown in FIG. 7, are captured between the upper member 15 and the top plate 60 and can only be removed by removing of the top plate.

FIG. 8 illustrates how the hinged door 6 can be moved upwardly and folded in its length to provide better access to the electrical outlets, generally shown as 72, secured to the top plate 60 of the electrical conduit. The upper surface of the electrical outlets is generally flush with the bottom of the hinged door to simplify the insertion of electrical plugs into the electrical outlets 72. The hinged door 6 may be folded and held in the folded condition by the lower section thereof engaging the vertical members. Thus, the access door may be opened and held in an open position. This would be valuable when any additional equipment is to be installed and access to electrical outlets is required. Other benefits of the door folding are illustrated in FIG. 9 where a computer 80 is shown in immediate proximity to the front surface of the panel 2 and the folding access door reduces the amount of space required to provide good access to the power access and storage space 22. Any surplus length of the electrical cord may be stored within this area.

It can also be appreciated that the folding door provides improved access when other equipment and/or structures such as tables 75 are in close proximity thereto, as illustrated in FIG. 11.

As shown in FIG. 9, the rear surface of the panel need not be identical to the opposing surface. For example, one surface includes the folding door 6 whereas the other includes a stationary decorative element 4c. Each can be moved to provide access to the storage area when required.

Although various preferred embodiments of the present invention have been described herein in detail, it will be appreciated by those skilled in the art, that variations may be made thereto without departing from the spirit of the invention or the scope of the appended claims.

We claim:

1. An office panelling system comprising a number of separate panels mechanically interconnected, each panel includes an interior framework which supports decorative covers either side thereof, said panels cooperating to define a horizontal electrical conduit extending in the length of the panels and located behind said decorative covers, said electrical conduit in each panel having removable side plates and a removable top plate, said top plate having a number of knock out areas for receiving electrical outlets which when received are accessible above said top plate, said electrical conduit in each panel further including a bottom member which supports said side plates and cooperates with said side plates and said top plate to close said conduit, said top plate being releasably secured in said panel by mechanical fasteners either side of said framework which secure said top plate to said interior framework, said top plate when secured in said interior framework cooperating with said side plates and said bottom member to define said electrical conduit therebetween, said top plate when retained in said framework by said mechanical fasteners trapping said side plates between said top plate and said bottom member, said top plate being releasable from said interior framework by release of said mechanical fasteners whereafter said side plates may be removed from said panel.

2. An office panelling system as claimed in claim 1 wherein said open storage area is provided above said top plate and said open storage area is closed at the sides thereof by a movable elongate cover by means of which said storage area is accessible.

3. An office panelling system as claimed in claim 2 wherein said movable elongate cover is hinged at an upper edge thereof and connected to said framework.

4. An office panelling system as claimed in claim 1 wherein said interior framework includes intermediate horizontal members extending across said framework, said intermediate horizontal members having a recess for engaging office filing cabinets or bins hung therefrom to support such office filing cabinets or bins intermediate the height thereof and to one side of said office panelling system.

5. An office panelling system as claimed in claim 4 in combination with office storage components of known heights, which office storage components are designed to hang to one side of a panel; and wherein said interior framework has intermediate horizontal members at spaced intervals extending across said frame; said framework including means for engaging said office storage components and cooperating therewith to hang said office storage components from said framework, said intermediate members being positioned relative to said means for engaging said office components to provide support adjacent a lower edge of said office storage components hung from a panel.

6. An office panelling system as claimed in claim 1 wherein an open storage area is provided above said top plate and said open storage area is closed at the sides thereof by a movable elongate cover by means of which said storage area is accessible.

7. An office panelling system as claimed in claim 6 wherein said movable elongate cover is hinged at an upper edge thereof and connected to said frame.

8. An office panelling system as claimed in claim 7 wherein said movable elongate cover includes a longitudinal hinge to accommodate folding of said elongate cover in the longitudinal direction thereof thereby reducing the amount of free space in front of said panel required to open said movable elongate cover and access said storage area.

9. An office panelling system as claimed in claim 8 including electrical outlets accessible in said storage area and secured to said top plate and connected to power within said electrical conduit through a port in said top plate covered by said electrical outlets.

10. An office panelling system as claimed in claim 9 wherein said electrical outlets are mounted in a box enclosure secured to said top plate and presenting said electrical outlets.

11. An office panelling system as claimed in claim 10 wherein said movable cover is of metal plate and the decorative element below said movable cover is of an acoustical material.

12. An office panelling system comprising a number of separate panels mechanically interconnected, each panel includes an interior framework which supports decorative covers either side thereof, said panels cooperating to define a horizontal electrical conduit extending in the length of the panels and located behind said decorative covers, said electrical conduit in each panel having side plates and a removable top plate, said top plate having ports for receiving electrical outlets which when received are accessible above said top plate, said electrical conduit in each panel further including a bottom member which cooperates with said side plates and said top plate to close said conduit and wherein an open storage area is provided above said top plate and said open storage area is closed at the sides thereof by a movable elongate cover, said movable elongate cover being hinged at an upper edge thereof and connected to said frame to accommodate pivotal movement about the upper edge to expose and allow access to said storage area, and wherein said movable cover includes a first longitudinal segment connected by a hinge to a owe second longitudinal a segment to accommodate longitudinal folding movement of said movable elongate cover such that the clear space in front of said movable elongate cover required to access said storage area is reduced as a result of the folding movement of said first and second longitudinal segments.

13. An office panelling system as claimed in claim 12 including electrical outlets accessible in said storage area and secured in access ports in said top plate, said electrical outlets being connected to power cables located within said electrical conduit.

14. An office panelling system as claimed in claim 13 wherein said electrical outlets are mounted in a box enclosure secured to said top plate and presenting said electrical outlets.

15. An office panelling system as claimed in claim 14 wherein said movable cover is of metal plate and the decorative element below said movable cover is of an acoustical material.

16. An office panelling system as claimed in claim 12 wherein said movable elongate cover includes a nandle adjacent a lower edge of said first longitudinal segment for moving said cover about said hinged upper edge to access said storage area.

17. An office panelling system as claimed in claim 16 wherein said movable elongate cover can be maintained in a position exposing said storage area by said second longitudinal segment engaging said framework and being in a folded orientation relative to said first longitudinal segment when said movable elongate cover has been moved about said hinged upper edge to expose said storage area.

* * * * *